(12) United States Patent
Hoshino et al.

(10) Patent No.: US 8,705,948 B2
(45) Date of Patent: Apr. 22, 2014

(54) VIDEO PLAYBACK DEVICE CAPABLE OF CONTROLLING PLAYBACK SPEED

(75) Inventors: Hiroyuki Hoshino, Ome (JP); Jun Muraki, Hamura (JP); Hiroshi Shimizu, Tachikawa (JP); Erina Ichikawa, Sagamihara (JP); Hiroyuki Kato, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 65 days.

(21) Appl. No.: 13/602,448

(22) Filed: Sep. 4, 2012

(65) Prior Publication Data
US 2013/0058633 A1   Mar. 7, 2013

(30) Foreign Application Priority Data
Sep. 6, 2011 (JP) ................. 2011-193462

(51) Int. Cl.
*H04N 5/783* (2006.01)
*H04N 21/234* (2011.01)

(52) U.S. Cl.
CPC ............... *H04N 21/23418* (2013.01)
USPC .......................... 386/343; 386/344

(58) Field of Classification Search
CPC .......... H04N 21/234; H04N 21/23418; H04N 21/4394; H04N 21/44218
See application file for complete search history.

(56) References Cited

U.S. PATENT DOCUMENTS

| 7,362,949 B2 | 4/2008 | Jun et al. |
| 2010/0026871 A1 | 2/2010 | Yonaha et al. |
| 2012/0011533 A1* | 1/2012 | Wright et al. ............. 725/21 |

FOREIGN PATENT DOCUMENTS

| JP | 2002-369146 A | 12/2002 |
| JP | 2005-286378 A | 10/2005 |
| JP | 2008-167423 A | 7/2008 |
| JP | 2009-075802 A | 4/2009 |
| JP | 2010-124884 A | 6/2010 |
| JP | 2010-252141 A | 11/2010 |
| KR | 10-2002-0026099 A | 4/2002 |

OTHER PUBLICATIONS

Korean Office Action dated Aug. 28, 2013 (and English translation thereof) in counterpart Korean Application No. 10-2012-0094665.
Japanese Office Action dated May 20, 2013 (and English translation thereof) in counterpart Japanese Application No. 2011-193462.

* cited by examiner

*Primary Examiner* — William C Vaughn, Jr.
*Assistant Examiner* — Asher Khan
(74) *Attorney, Agent, or Firm* — Holtz, Holtz, Goodman & Chick, PC

(57) ABSTRACT

A video playback device including a playback section which replays a video, a setting section which sets a predetermined area within the video frames being replayed by the playback section, a detecting section which detects whether or not a predetermined subject is included within the predetermined area, a selecting section which selectively switches between a first playback speed and a second playback speed based on the timing of the detection by the detecting section, and a control section which controls the playback speed of the playback section in accordance with a result of the selection by the selecting section.

12 Claims, 7 Drawing Sheets

VIDEO PLAYBACK DEVICE CAPABLE OF CONTROLLING PLAYBACK SPEED

CROSS-REFERENCE TO RELATED APPLICATION

This application is based upon and claims the benefit of priority from the prior Japanese Patent Application No. 2011-193462, filed Sep. 6, 2011, the entire contents of which is incorporated herein by reference.

BACKGROUND OF THE INVENTION

1. Field of the Invention

The present invention relates to a video playback device, a video playback method, and a recording medium with a program recorded therein. More specifically, the present invention relates to a video playback device, a video playback method, and a recording medium with a program recorded therein by which playback speed can be controlled and a scene of interest can be quickly found during video playback.

2. Description of the Related Art

Video shooting is often incorporated into sports training. An example of this is a case where a person's golf swing is captured on video. The video is immediately replayed and checked, whereby the person can judge whether their golf swing is good or bad with their own eyes. As a result, the person can practice more effectively.

However, in a case where the person performs a video shooting of themselves, the subject person is required to (i) approach the video camera to perform an operation to start video shooting, (ii) return to a position to be captured on video to perform a required movement (swings, in the instance of golf), and (iii) return to the video camera to perform an operation to stop the video shooting. Therefore, there is an inconvenience in that unnecessarily captured scenes, i.e., the scene (i) and the scene (iii) are included in the beginning and the end of the video.

As a technology to avoid this inconvenience, Japanese Patent Application Laid-Open (Kokai) Publication No. 2010-252141 discloses a technology in which judgment is made regarding whether or not a predetermined subject is included in a predetermined area of a video being taken, and the video is recorded when the judgment result is affirmative.

With this technology, in the case of golf practice, video recording starts when the subject who is going to perform a golf swing enters an area to be captured on video. Therefore, a video of their golf practice with minimal unnecessary scenes can be recorded.

However, this technology is for "video shooting" and has not been conceived taking "video playback" into consideration. Therefore, there is a problem in that bothersome operations, such as fast-forwarding, are required to be performed to find and replay a scene of interest in a video.

Accordingly, a technology is required by which a scene of interest can be quickly found during video playback.

SUMMARY OF THE INVENTION

The present invention has been conceived in light of the above-described problem. In accordance with one aspect of the present invention, there is provided a video playback device comprising: a playback section which replays a video; a setting section which sets a predetermined area within video frames being replayed by the playback section; a detecting section which detects whether or not a predetermined subject is included within the predetermined area; a selecting section which selectively switches between a first playback speed and a second playback speed based on timing of detection by the detecting section; and a control section which controls playback speed of the playback section in accordance with a result of selection by the selecting section.

In accordance with another aspect of the present invention, there is provided a video playback method comprising: a playback step of replaying a video; a setting step of setting a predetermined area within video frames being replayed in the playback step; a detecting step of detecting whether or not a predetermined subject is included within the predetermined area; a selecting step of selectively switching between a first playback speed and a second playback speed based on timing of detection in the detecting step; and a control step of controlling playback speed in the playback step in accordance with a result of selection in the selecting step.

In accordance with another aspect of the present invention, there is provided a non-transitory computer-readable storage medium having stored thereon a program that is executable by a computer in a video playback device, the program being executable by the computer to perform functions comprising: playback processing for replaying a video; setting processing for setting a predetermined area within video frames being replayed by the playback processing; detection processing for detecting whether or not a predetermined subject is included within the predetermined area; selection processing for selectively switching between a first playback speed and a second playback speed based on timing of detection by the detection processing; and control processing for controlling playback speed of the playback processing in accordance with a result of selection by the selection processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described with reference to the drawings.

Figure 1:
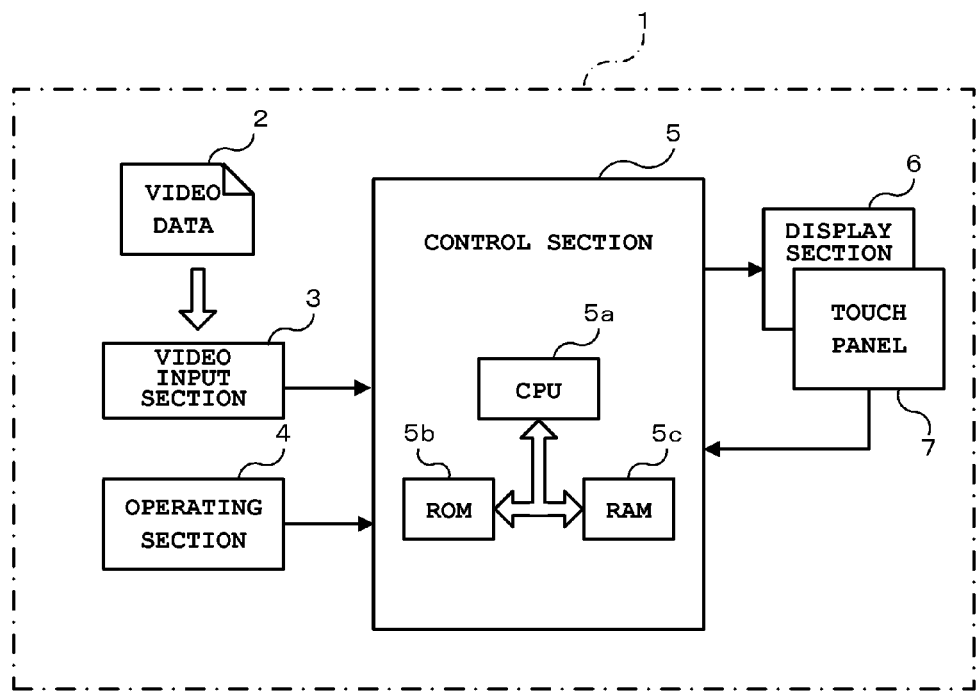
FIG. 1 is a block diagram of a video playback device 1 according to an embodiment.

FIG. 1 is a block diagram of a video playback device 1 according to the embodiment. This video playback device 1 includes a video input section 3 that receives video data 2, an operating section 4 for performing various operations required during video playback, a control section 5 constituted by a computer, a display section 6 such as a liquid crystal display, and a touch panel 7 mounted to cover the screen of the display section 6, as shown in FIG. 1. Note that the display section 6 and the touch panel 7 may be external components positioned outside of the video playback device 1.

The control section 5 includes a central processing unit (CPU) 5a, a read-only memory (ROM) 5b, a random access memory (RAM) 5c, and a peripheral circuit (not shown), and is a program-controlled control element that integrates and controls the operations of each section of the video playback device 1 by loading software, such as a control program, stored in the ROM 5b into the RAM 5c and running it by the CPU 5a.

Note that the video playback device 1 in FIG. 1 may be a video playback device that operates as a single unit, such as a video player (hereinafter referred to as a stand-alone type), or may be a video playback device mounted in an arbitrary electronic device (hereinafter referred to as a built-in type). This arbitrary electronic device may be, for example, a digital video camera, or a digital camera or a mobile phone including a video shooting function, but is not limited thereto. All that is required is that it is capable of replaying and displaying video data. For example, it may be a personal computer (desktop-type or mobile-type).

Figure 2:
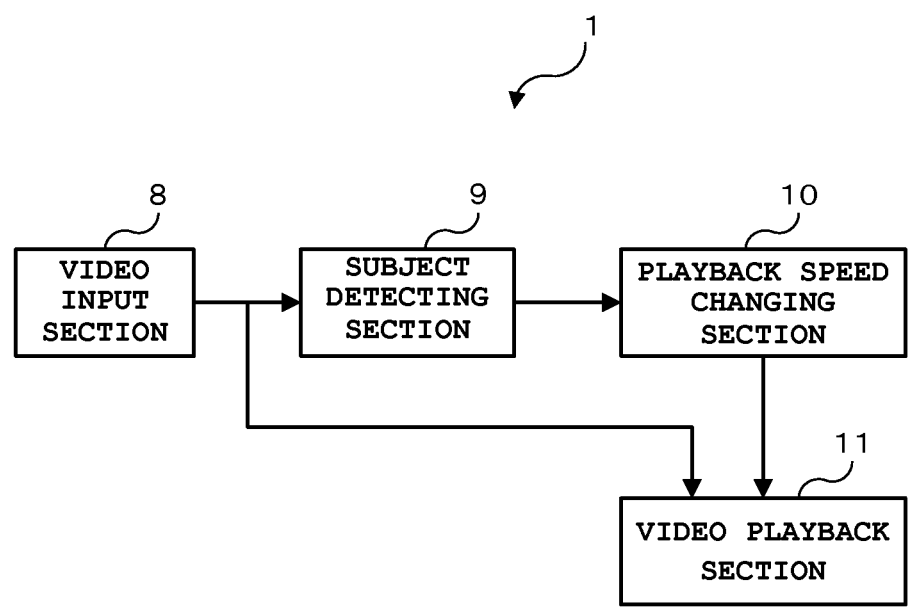
FIG. 2 is a functional schematic diagram of the video playback device 1.

FIG. 2 is a functional schematic diagram of the video playback device 1. The video playback device 1 has several functions actualized by the organic coupling of software stored in the ROM 5b and hardware, such as the CPU 5a, of the control section 5 in FIG. 2.

A first function is "video input" (which corresponds to the video input section 3 in FIG. 1) for inputting arbitrary video data (see video data 2 in FIG. 1). This function is hereinafter referred to as a video input section 8. Video data (also referred to as a video file) captured by another device in advance is inputted into the video input section 8 by being loaded over a cable or wirelessly, or via a medium (in the instance of the stand-alone type). Alternatively, video data captured and recorded by a camera section (not shown) is inputted into the video input section 8 (in the instance of the built-in type).

A second function is for detecting a predetermined subject within video data. This function is referred to as a subject detecting section 9 and is mainly actualized by software in the control section 5. The predetermined subject may be, for example, a person's face. In the case where the subject is a person's face, a known facial recognition technology can be applied.

A third function is for changing playback speed during video playback. This function is referred to as a playback speed changing section 10, and is mainly actualized by software in the control section 5, as in the case of the subject detecting section 9.

The playback speed refers to the number of unit images constituting video (referred to as frames) played per unit time (generally one second). The standard playback speed is referred to as "normal speed". In normal speed playback, the playback of a video is performed at the same speed as the recording speed (generally 30 frames per second) of the video. Also, playback performed at a speed n-times (in which n>1) the normal speed is referred to as "fast-forward". Conversely, playback performed at a speed n-times (in which n<1) the normal speed is referred to as "slow-motion". Setting playback speed to zero at a random scene is referred to as "pause".

The playback speed changing section 10 is capable of changing playback speed to "normal speed", "fast forward", "slow-motion", and "pause", as described above. In this embodiment, to simplify the description, the playback speed changing section 10 is capable of changing playback speed to two speeds, "normal speed" and "fast forward". When the subject detecting section 9 does not detect a predetermined subject, the playback speed changing section 10 changes playback speed to "fast forward". When the subject detecting section 9 detects a predetermined subject, the playback speed changing section 10 changes playback speed to "normal speed".

That is, playback speed is set to "fast forward" when a predetermined subject is not detected, and is set to "normal speed" when a predetermined subject is detected.

A fourth function is for replaying video data inputted into the video input section 8 at a predetermined playback speed (fast forward or normal speed). This function is hereinafter referred to as a video playback section 11. The video playback section 11 replays and displays video data at a playback speed based on an output (fast forward or normal speed) of the playback speed changing section 10.

Figure 3:
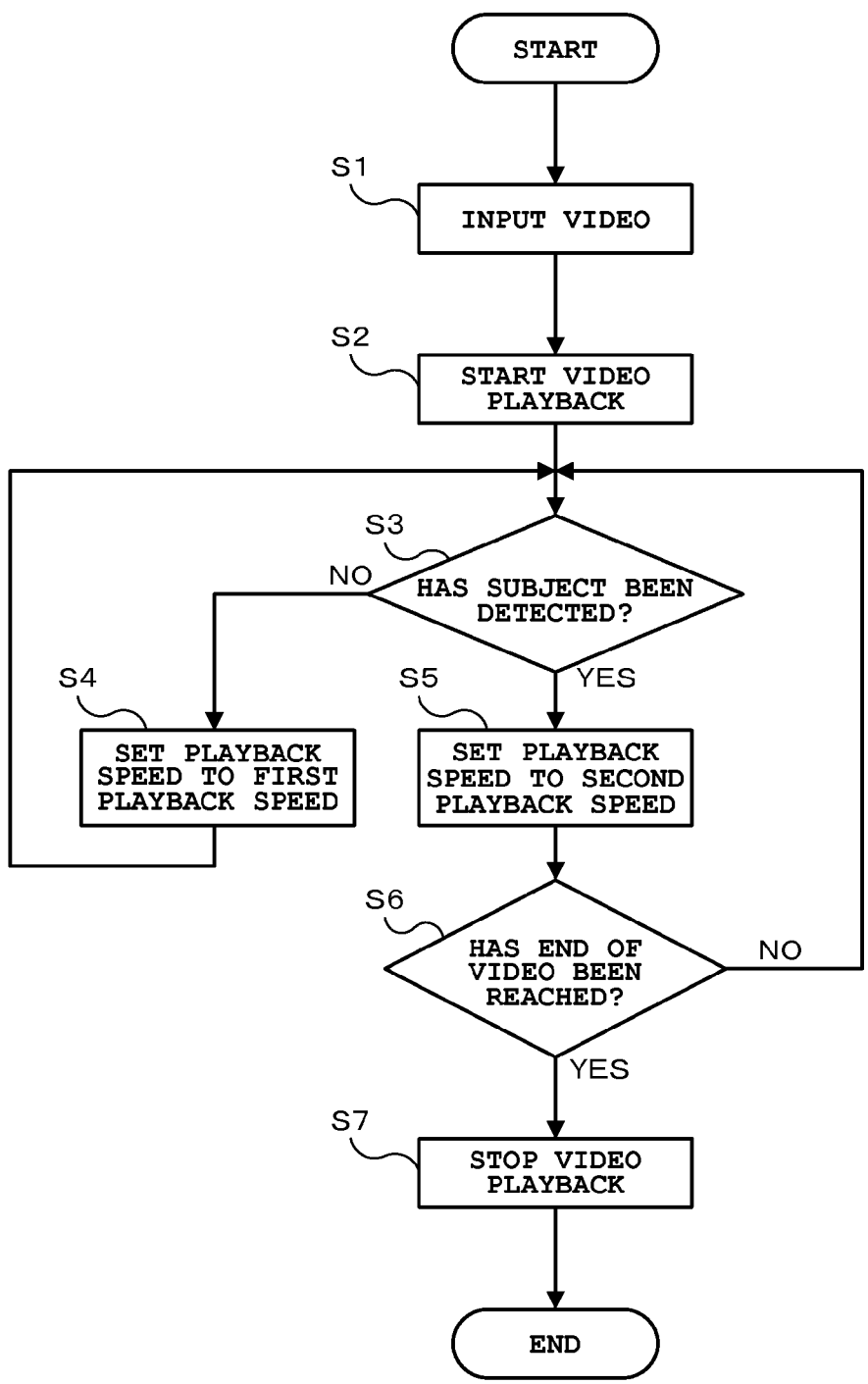
FIG. 3 is a flowchart of operations of the video playback device 1.

FIG. 3 is a flowchart of operations of the video playback device 1. In this flow, the video playback device 1 first receives video data (Step S1) and starts video playback (Step S2). Then, the video playback device 1 judges whether or not a predetermined subject is included in the video for each playback frame (Step S3).

When judged that the predetermined subject is not included in the video ("NO" at Step S3), the video playback device 1 changes the playback speed to a first playback speed corresponding to the above-described "fast forward" (Step S4), and returns to Step S3. Conversely, when judged that the predetermined subject is included in the video ("YES" at Step S3), the video playback device 1 changes the playback speed to a second playback speed corresponding to the above-described "normal speed" (Step S5), and judges whether or not the end of the video has been reached (Step S6).

Next, when judged that the video has not yet ended, the video playback device 1 returns to Step S3. When judged that the video has ended, the video playback device 1 stops the video playback (Step S7) and completes the flow.

Figure 4:
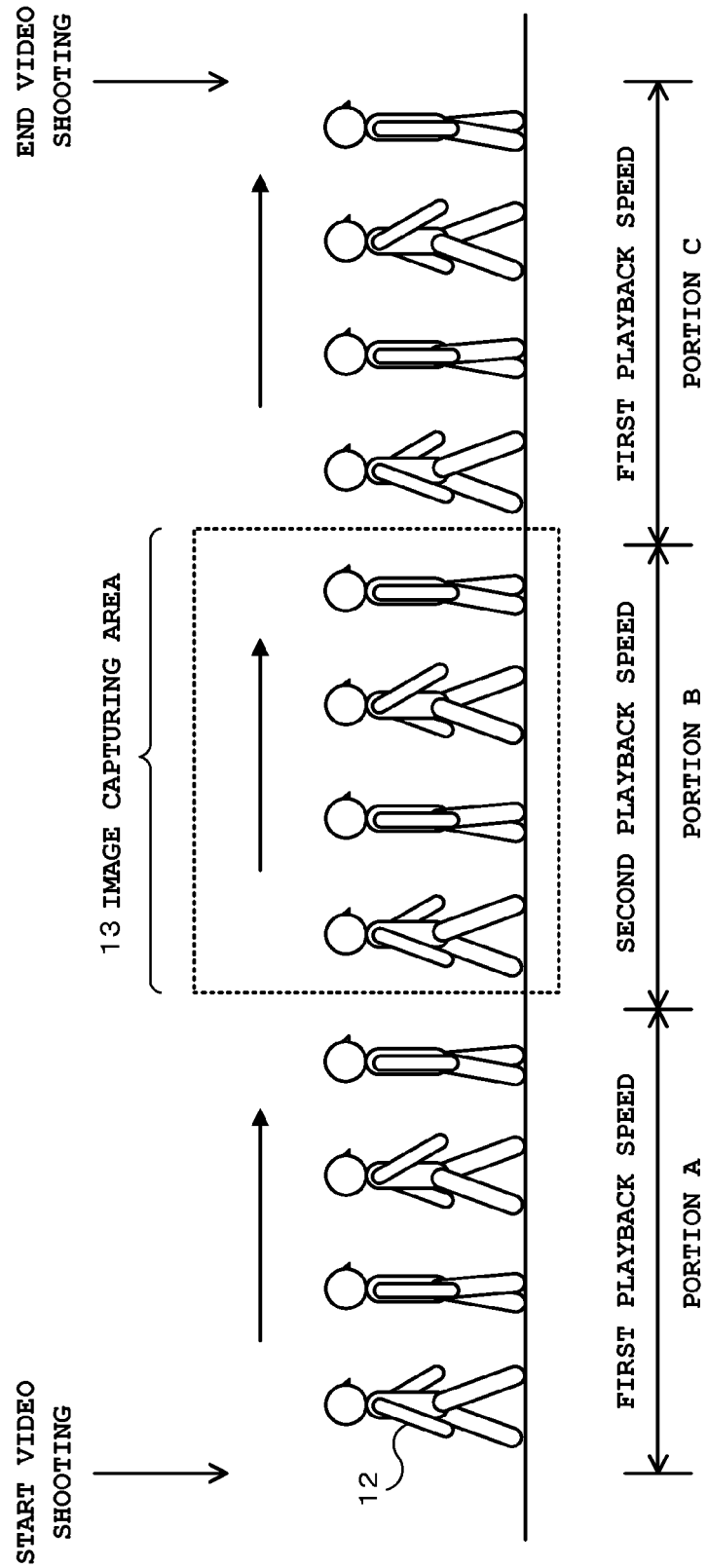
FIG. 4 is an explanatory diagram of the effects of the video playback device 1.

FIG. 4 is an explanatory diagram of the effects of the video playback device 1. In FIG. 4, a scene in which a person 12 is walking from the left end to the right end on a horizontal axis is given as an example, and this scene is captured on video.

Note that an image capturing area 13 for the video is within the horizontally long rectangular frame drawn by dotted lines which is positioned near the center on the horizontal axis. The video shooting starts near the left end of the horizontal axis and ends near the right end.

In this instance, since the image capturing area 13 is near the center on the horizontal axis, the person 12 is not captured in the first ⅓ portion (portion A) and the last ⅓ portion (portion C) of the video data. That is, the person 12 is only captured in the middle ⅓ portion (portion B). Therefore, the playback of the portion A and the portion C is unnecessary for the playback of this video data. In such instances, an operation such as fast-forwarding is generally performed, but is bothersome and inconvenient.

Therefore, in the video playback device 1 according to the present embodiment, the playback speed is set to the first playback speed corresponding to "fast forward" when the predetermined subject (the person 12 in FIG. 4) is not included in the video data, and is set to the second playback speed corresponding to "normal speed" when the subject is included in the video data. As a result, time required for the unnecessary playback is reduced and the scene of interest (portion B) can be quickly found.

As described above, the principle of the technical concept of the present embodiment is that, when a predetermined subject is not included in video data during playback, the playback speed is set to the first playback speed, and when the predetermined subject is included in the video data, the playback speed is set to the second playback speed. Preferably, the first playback speed is equivalent to fast-forwarding, and the second playback speed is equivalent to normal speed. As a result, the above-described problem can be solved, or in other words, time required for unnecessary playback can be reduced and a scene of interest can be quickly found. Note that the present invention is not limited thereto and may be configured as follows in terms of practical use.

Figure 5A:
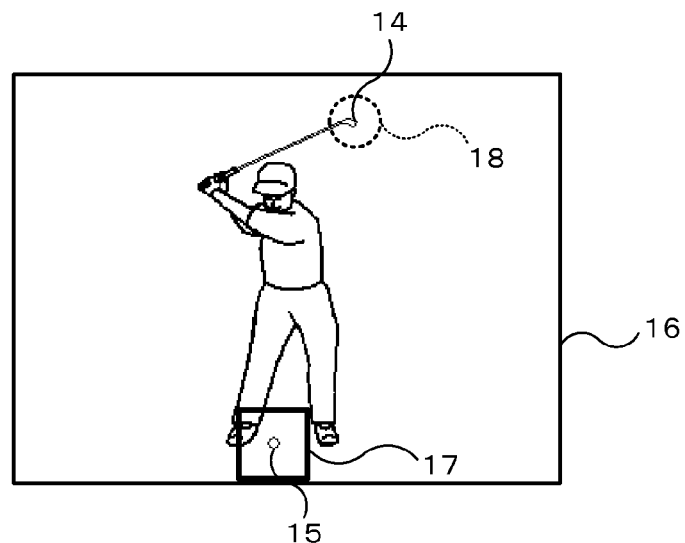
FIG. 5A to FIG. 5C are explanatory diagrams of a preferred embodiment in terms of practical use.
Figure 5B:
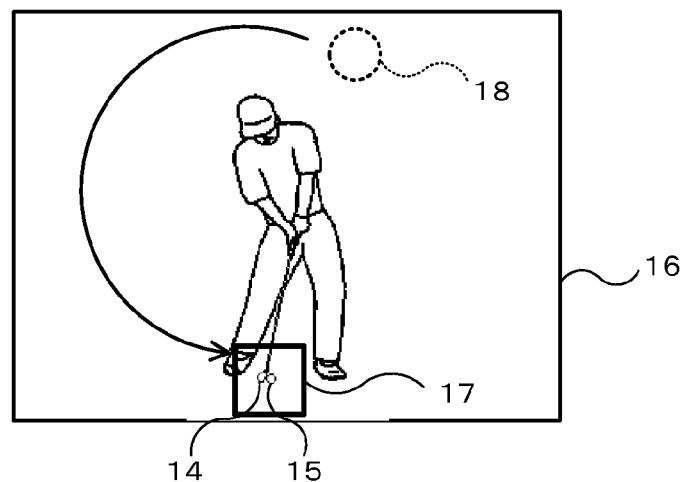
Figure 5C:
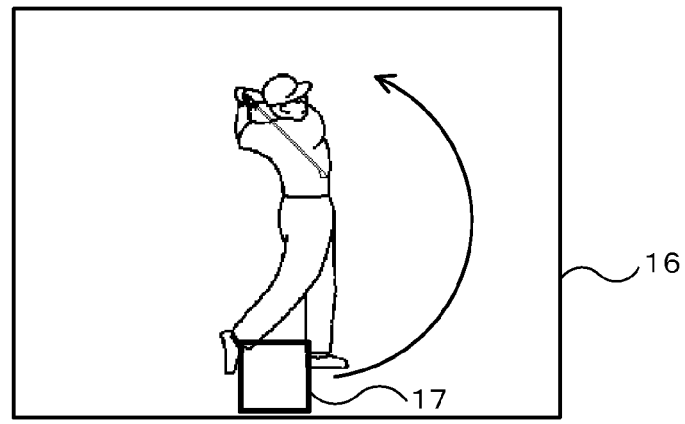

FIG. 5A to FIG. 5C are explanatory diagrams of a preferred embodiment in terms of practical use. In the case of golf practice, for example, the instant at which a club head 14 strikes a ball 15 (instant of impact) is an important point for checking a golf swing. Accordingly, during the playback of a video of the entire swing motion, slow-motion or pause operation is generally performed at the instant of impact. However, this operation is bothersome and inconvenient.

Therefore, a configuration is proposed in which the instant of impact is automatically detected and the playback speed is changed to a desired playback speed. In this configuration, first, the user sets an area of interest 17 in a desired position on the screen 16 of the display section 6 by operating the touch panel 7. The area of interest 17 herein is a detection window where playback speed is changed to a desired speed when a subject enters thereinto.

Then, the club head 14 is set as the subject, playback speed that is used until the club head 14 enters the area of interest 17 is set to the first playback speed, playback speed that is used after the club head 14 enters the area of interest 17 is set to the second playback speed, the first playback speed is set to "fast forward", and the second playback speed is set to "normal speed".

As a result, fast-forward playback is performed from the top swing in FIG. 5A to immediately before the impact in FIG. 5B, and normal-speed playback is performed from the impact in FIG. 5B to the follow-through in FIG. 5C. Therefore, the amount of time spent on the unnecessary playback of the scene of FIG. 5A can be reduced, the scene of interest in FIG. 5B can be quickly cued, and swing check using the scenes from FIG. 5B to FIG. 5C can be quickly performed.

In the description above, the predetermined subject is the club head 14. Accordingly, a configuration for performing image recognition to detect the club head 14 is required. As such a configuration, a configuration may be adopted in which a subject designation frame 18 for designating the club head (the club head in the drawings is merely an example and can be any portion of the subject) is set, as shown in FIG. 5A. In this configuration, an image (the club head 14 in this instance) included in the subject designation frame 18 is registered as a reference image, and an image corresponding to the reference image is detected and tracked for each frame. As a result, the club head 14 that is the subject can be detected and tracked from the top swing in FIG. 5A to the follow-through in FIG. 5C, and the playback speed can be changed to a desired playback speed after the club head 14 has entered the area of interest 17.

In addition, when the subject designation frame 18 is set in another portion of the subject, or in other words, a portion other than the club head, this portion can be tracked.

In the case of a golf swing, not only a predetermined amount of time after the impact but also a predetermined amount of time before the impact is important. To support a case such as this, timing at which a subject portion is detected during video playback and timing at which the replayed image is displayed may be shifted, and the playback speed may be changed for a predetermined amount of time before and after the detection timing (the playback speed is changed retroactively from the detection timing).

That is, the timing at which playback speed is changed may be a predetermined amount of time before a subject enters the area of interest 17 or a predetermined amount of time before and after the subject enters the area of interest 17, in addition to a predetermined amount of time after the subject enters the area of interest 17.

In the case of the example shown in FIG. 5A to FIG. 5C, the playback speed is kept at the first playback speed until a time point that is a predetermined amount of time before the club head 14 enters the area of interest 17, and then switched to the second playback speed after this point. The playback speed is kept at the second playback speed until a time point that is a predetermined amount of time after the club head 14 enters the area of interest 17, and then switched back to the first playback speed after this point.

As a result, fast-forward playback is performed from the top swing in FIG. 5A to slightly before the impact in FIG. 5B, normal-speed playback is performed before and after the impact in FIG. 5B, and fast-forward playback is performed from the follow-through in FIG. 5C. Therefore, the amount of time spent on the unnecessary playback of the scenes of FIG. 5A and FIG. 5C can be reduced, and swing check using the scene of interest in FIG. 5B can be quickly performed.

Note that, in this instance, the user may individually set the first predetermined amount of time and the latter predetermined amount of time.

Also, the processing for detecting and tracking the club head 14 and detecting whether or not the club head 14 has entered the area of interest 17 is performed by successively detecting the position coordinates of the club head 14, tracking changes in the position coordinates being successively detected, and detecting whether or not the tracked position coordinates are within the area coordinates of the area of interest 17. However, the tracking operation is not necessarily required to be performed, as described hereafter.

That is, a configuration may be adopted in which image recognition is performed only within the area coordinates of the area of interest 17, and whether or not the club head 14 has entered the area within the area coordinates of the area of interest 17 is detected.

Figure 6:
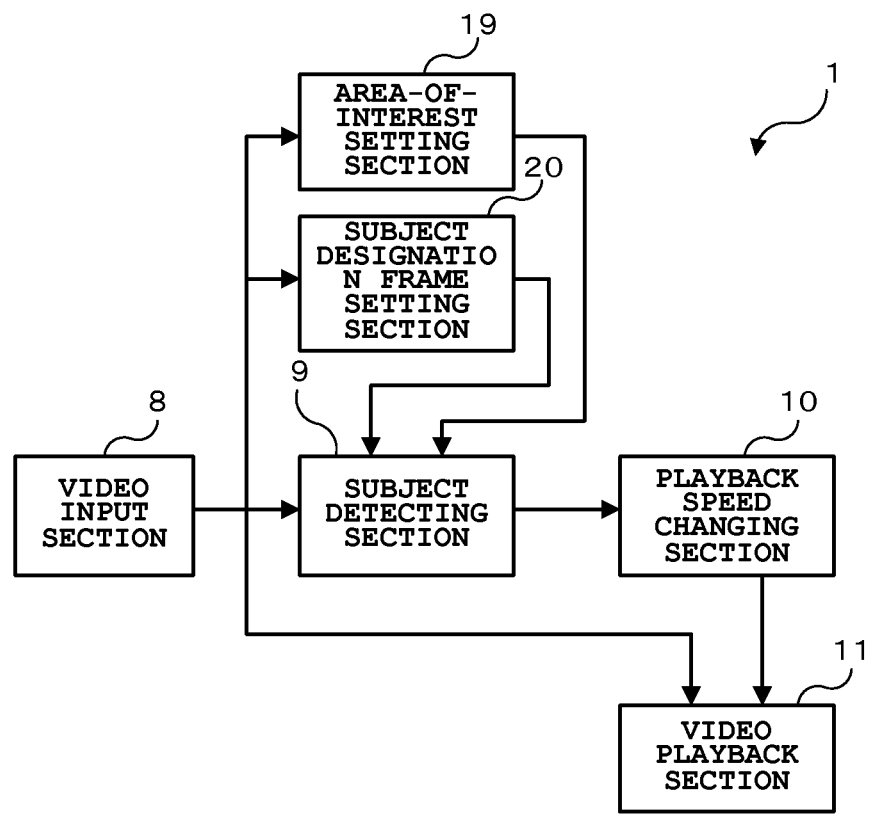
FIG. 6 is a functional schematic diagram of the video playback device 1 to which functions for setting a target area 17 and a subject designation frame 18 have been added.

FIG. 6 is a functional schematic diagram of the video playback device 1 to which functions for setting the area of interest 17 and the subject designation frame 18 have been added. The video playback device 1 in FIG. 6 differs from that of FIG. 2 in that the function for setting the area of interest (hereinafter referred to as an area-of-interest setting section 19) and the function for setting the subject designation frame (hereinafter referred to as a subject designation frame setting section 20) that are mainly actualized by software in the control section 5 have been added.

The area-of-interest setting section 19 detects a touch operation performed on the touch panel 7 by the user, and sets the area of interest 17 (see FIG. 5) in the touched position on the screen 16 of the display section 6. Similarly, the subject designation frame setting section 20 detects a touch operation performed by the user, and sets the subject designation frame 18 (see FIG. 5) in the touched position on the screen 16 of the display section 6. The subject detecting section 9 detects whether or not a predetermined subject is included in the area of interest 17. In a case where a subject has been designated by the subject designation frame 18, the subject detecting section 9 detects and tracks the subject as a predetermined subject.

Note that, although the area of interest 17 and the subject designation frame 18 are set separately in the above-described embodiment, they can be set as follows.

Figure 7:
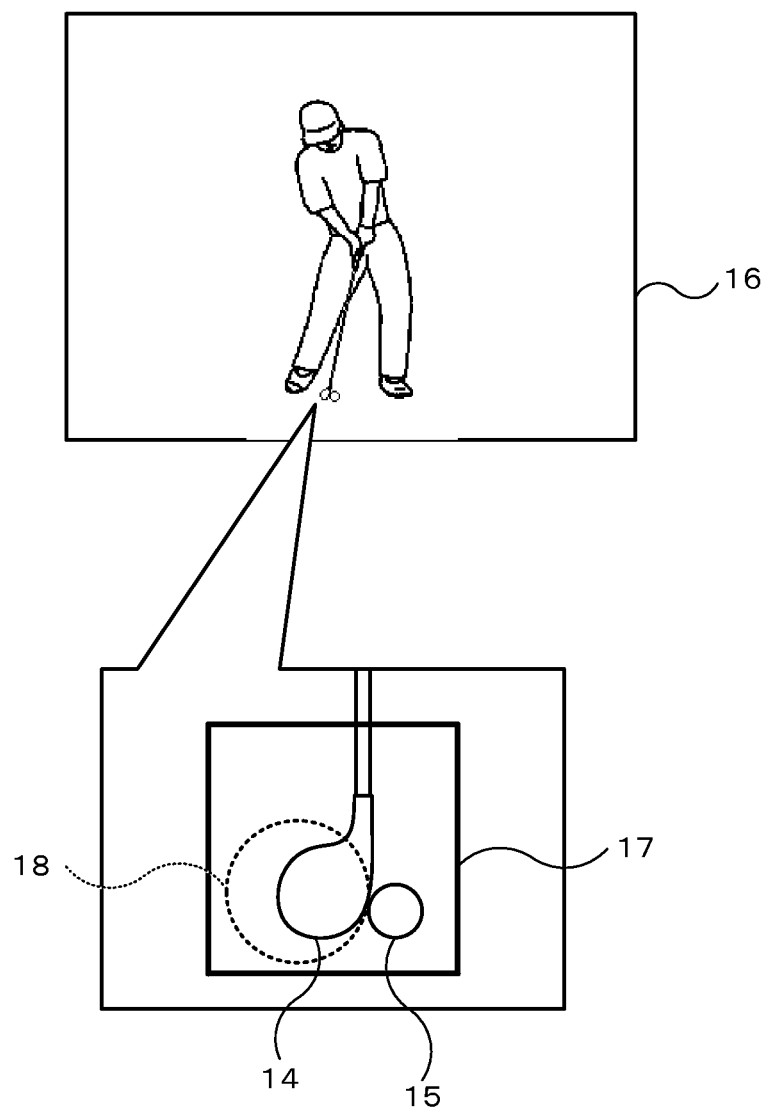
FIG. 7 is a diagram showing another embodiment of the present invention.

FIG. 7 is a diagram showing another embodiment of the present invention. In a golf stance state where the club head 14 is held near the ball 15, the club head 14 is positioned within the area of interest 17. Accordingly, the subject designation frame 18 for the club head 14 positioned within the area of interest 17 may be set simultaneously with the setting of the area of interest 17. As a result, the area of interest 17 can be set simultaneously with the subject designation frame 18, whereby the setting operations can be simplified.

Also, although the first playback speed, at which playback speed is kept until a predetermined subject enters the area of interest 17, is "fixed playback speed" corresponding to fast forwarding in the description above, the present invention is not limited thereto, and it may be "variably set" corresponding to, for example, the movement speed of a predetermined subject. That is, the purpose of the first playback speed is to reduce the amount of time spent on unnecessary playback, and therefore the first playback speed may be configured such that it is accelerated (the number of frames to be skipped is increased) as the movement speed of a predetermined subject slows down.

In a case where a scene of interest is required to be replayed in slow motion, the first playback speed may be normal speed. In this case, the playback speed is changed to be slower after a designated portion of the subject enters the target area 17.

Moreover, although the above description states that "playback speed is changed when a predetermined subject enters the area of interest 17", the present invention is not limited thereto. In a case where a predetermined subject is already in the area of interest 17 at the start of video playback, the change of playback speed described above, or in other words, the operation by which "playback speed is changed when a predetermined subject enters the area of interest 17" may be performed after waiting until the subject leaves the area of interest 17.

While the present invention has been described with reference to the preferred embodiments it is intended that the invention be not limited by any of the details of the description therein but includes all the embodiments which fall within the scope of the appended claims.

What is claimed is:

1. A video playback device comprising:
   a playback section which replays a video;
   an area setting section which sets an arbitrary area within video frames being replayed by the playback section;
   a designating section via which a user designates an arbitrary subject present within the video frames;
   a tracking section which tracks the arbitrary subject designated by the designating section;
   a detecting section which detects, based on tracking by the tracking section, when the arbitrary subject is included within the arbitrary area set by the area setting section;
   an identifying section which identifies a timing of detection by the detecting section;
   a selecting section which selectively switches between a first playback speed and a second playback speed based on the timing of the detection identified by the identifying section; and
   a control section which controls a playback speed of the playback section in accordance with a result of selection by the selecting section.

2. The video playback device according to claim 1, wherein the identifying section identifies a predetermined time range including the timing of the detection; and
   wherein the selecting section selectively switches between the first playback speed and the second playback speed between inside and outside of the time range identified by the identifying section.

3. The video playback device according to claim 1, wherein the area setting section sets the arbitrary area in an arbitrary position within the video frames based on an operation by the user.

4. The video playback device according to claim 1, wherein the designating section designates an arbitrary position within the video frames as the arbitrary subject; and
   wherein the tracking section tracks an image included in the position designated by the designating section.

5. The video playback device according to claim 3, wherein designating of the arbitrary subject by the designating section and setting of the arbitrary area by the area setting section are simultaneously performed based on one operation by the user.

6. The video playback device according to claim 2, further comprising:
   an amount-of-time setting section via which the user arbitrarily sets a predetermined amount of time between before and after the timing of the detection by the detecting section;
   wherein the identifying section identifies as the predetermined time range a period which includes the timing of the detection by the detecting section and is the predetermined amount of time set by the amount-of-time setting section before and after the timing of the detection by the detecting section.

7. The video playback device according to claim 3, wherein the first playback speed is a playback speed corresponding to fast-forwarding and the second playback speed is a playback speed corresponding to normal speed playback, slow-motion playback, or pause.

8. The video playback device according to claim 7, wherein the selecting section selects the second playback speed during a predetermined period including the timing of the detection by the detecting section, and selects the first playback speed during other periods.

9. The video playback device according to claim 1, further comprising a varying section which variably sets the first playback speed in accordance with a movement speed of the predetermined subject being tracked by the tracking section.

10. The video playback device according to claim 1, wherein the detecting section performs, when the arbitrary subject is included within the arbitrary area at start of video playback by the playback section, a detecting operation to detect when the arbitrary subject is included within the arbitrary area after waiting until the subject leaves the area.

11. A video playback method comprising:
    a playback step of replaying a video;
    an area setting step of setting an arbitrary area within video frames being replayed in the playback step;
    a designating step in which a user designates an arbitrary subject present within the video frames;
    a tracking step of tracking the arbitrary subject designated by the designating step;
    a detecting step of detecting, based on tracking by the tracking step, when the arbitrary subject is included within the arbitrary area set by the area setting step;
    an identifying step of identifying a timing of detection by the detecting step;
    a selecting step of selectively switching between a first playback speed and a second playback speed based on the timing of the detection identified by the identifying step; and a control step of controlling a playback speed in the playback step in accordance with a result of selection in the selecting step.

12. A non-transitory computer-readable storage medium having stored thereon a program that is executable by a computer in a video playback device, the program being executable by the computer to cause the video playback device to function as elements comprising:

a playback section which replays a video;

an area setting section which sets an arbitrary area within video frames being replayed by the playback section;

a designating section via which a user designates an arbitrary subject present within the video frames;

a tracking section which tracks the arbitrary subject designated by the designating section;

a detection section which detects, based on tracking by the tracking section, when the arbitrary subject is included within the arbitrary area;

an identifying section which identifies a timing of detection by the detection section;

a selection section which selectively switches between a first playback speed and a second playback speed based on the timing of the detection identified by the identifying section; and a control section which controls a playback speed of the playback section in accordance with a result of selection by the selection section.

\* \* \* \* \*